United States Patent [19]

Kambayashi et al.

[11] Patent Number: 5,041,475
[45] Date of Patent: Aug. 20, 1991

[54] METHOD FOR PRODUCTION OF INCLUSION WATER FOR HARDENING GYPSUM, METHOD FOR PRODUCTION OF SHAPED ARTICLE OF GYPSUM, AND SHAPED ARTICLE OF GYPSUM

[75] Inventors: Taiji Kambayashi, Yamatotakada; Hideyuki Mekata, Kitakatsuragi; Hiroyuki Kataoka, Matsubara; Chuzo Kato, Tokyo, all of Japan

[73] Assignee: Osaka Yuki Kagaku Kogyo Kabushiki Kaisha, Osaka, Japan

[21] Appl. No.: 617,107

[22] Filed: Nov. 21, 1990

Related U.S. Application Data

[62] Division of Ser. No. 509,832, Apr. 17, 1990, Pat. No. 4,988,390.

[30] Foreign Application Priority Data

Apr. 19, 1989 [JP] Japan .................................. 1-97516

[51] Int. Cl.$^5$ ............................................. C04B 24/26

[52] U.S. Cl. ......................................... 524/5; 524/547
[58] Field of Search ................................................ 524/5

[56] References Cited

PUBLICATIONS

CA92(20):168103.
CA85(4):24888b.
CA72(26):136019g.

Primary Examiner—Joseph L. Schofer
Assistant Examiner—M. Nagumo
Attorney, Agent, or Firm—Armstrong, Nikaido, Marmelstein, Kubovcik & Murray

[57] ABSTRACT

A shaped article of gypsum possessing heretofore unattainable high strength, a method for the production of the shaped article, and a method for the production of inclusion water indispensable to the hardening by hydration of the production of the shaped article of gypsum are disclosed.

3 Claims, No Drawings

METHOD FOR PRODUCTION OF INCLUSION WATER FOR HARDENING GYPSUM, METHOD FOR PRODUCTION OF SHAPED ARTICLE OF GYPSUM, AND SHAPED ARTICLE OF GYPSUM

This is a division of application Ser. No. 509,832 filed Apr. 17, 1990, now U.S. Pat. No. 4,988,390.

BACKGROUND OF THE INVENTION

In the production of a shaped article of gypsum, the amount of water theoretically required for the reaction of hardening by hydration of hemihydrate gypsum is about 20% by weight of the weight of the hemihydrate gypsum. With this theoretical amount of water, however, the act itself of mixing the hemihydrate gypsum with the water is difficult to carry through. For the purpose of homogeneously mixing them and enabling the resultant mix to retain satisfactory slowability, it has been necessary to use water in a much larger amount.

The amount of water used in the process of production has bearing on the strength which the shaped article of gypsum acquires after it hardens; the shaped article of gypsum using a larger amount of water is conspicuously inferior in strength and durability to the shaped article of gypsum using water in the theoretical amount. Studies are now under way in search of a method which allows a decrease in the amount of water to be mixed with gypsum during the course of production of a shaped article of gypsum, only to encounter the problem mentioned above. In the circumstances, the desirability of perfecting a shaped article of gypsum which possesses ample strength and durability and allows easy blending during the course of production and a method for the production of this shaped article of gypsum has been finding enthusiastic recognition.

BRIEF SUMMARY OF THE INVENTION

This invention is aimed at effecting the hardening by hydration of gypsum by a procedure which comprises mixing gypsum powder with water prepared in advance in the form of dry minute beads of gypsum-hardening quality inclusion water (hereinafter referred to as "inclusion water") by virtue of a specific absorbent polymer and subsequently expelling the inclusion water from the including polymer.

DETAILED DESCRIPTION OF THE INVENTION

The present inventors have found that when an absorbent polymer which, on absorbing water, retains the form of minute discrete dry beads including water structurally therein is used for hardening gypsum, it enables hemihydrate gypsum or anhydrous gypsum to be hardened by hydration with a small amount of water and allows easy production of a shaped article of gypsum with high strength. The present invention has been perfected as the result.

The conventional absorbent polymer, on absorbing water, assumes a jellylike form and, on being mixed with gypsum powder, gives rise to wet clusters of powder and fails to effect homogeneous mixture. The absorbent polymer which is used in the method for the production of inclusion water in accordance with the present invention remains in the form of dry beads even after absorption of water and, therefore, permits itself to be dry mixed with gypsum powder.

In accordance with the method of this invention for the production of inclusion water, since inclusion water beads possessing a desired stable diameter can be easily produced, they can be easily and homogeneously mixed in the dry state with gypsum powder. Moreover, the inclusion water need not be produced at a specific place but may be easily produced at any place at any time. When it is required to be used at a place incapable of water supply, the water can be transported to that place in the form of dry beads.

Further, in accordance with the method of this invention for the production of a shaped article of gypsum, since the shaped article can be produced with the theoretical amount of water owing to the use of water in the form of inclusion water, the produced shaped article excels in strength and durability. Owing to the low mixing ratio of water, shaped articles can be produced continuously by extrusion molding or roll molding, when necessary, in large sizes. The shaped articles so produced enjoy high quality because their surfaces are prevented from collecting dews and forming a chalky coat.

The absorbent polymer to be used in the present invention is obtained by dissolving an acrylic copolymer in an aliphatic hydrocarbon, dispersing acrylic acid and an aqueous solution of an alkali metal salt thereof in the resultant solution, subjecting the resultant dispersion to reversed-phase suspension polymerization, cross-linking the resultant polymer, and drying the cross-linked polymer. The copolymer to be used herein in a copolymer having the following components.

(a) 40 to 95% by weight of a monomer, specifically an alkyl acrylate or an alkyl methacrylate, having an alkyl group of not less than 8 carbon atoms, (b) 5 to 40% by weight of a monomer, specifically at least one derivative selected from the group consisting of acrylic acid, methacrylic acid, acrylamide, and methacrylamide and containing at least one group selected from the class consisting of carboxyl group, amino group, quaternary ammonium group, and hydroxyl group, and (c) 0 to 40% by weight of an unsaturated monomer copolymerizable with the components (a) and (b) mentioned above.

The alkyl acrylate or methacrylate as the component of (a) is only required to have an alkyl group having at least 8 carbon atoms. The monomers of this description which are readily available on the market include 2-ethylhexyl acrylate, 2-ethylhexyl methacrylate, lauryl acrylate, lauryl methacrylate, tridecyl acrylate, tridecyl methacrylate, lauryl-tridecyl acrylate mixed ester, stearyl acrylate, and stearyl methacrylate, for example.

In the selection of the component of (a), the height of glass transition point ought to constitute an important consideration because, during the synthesis of a dispersant by aqueous suspension polymerization, the unsusceptibility of the produced water inclusion beads to conglomeration increases in proportion as the glass transition point rises. The glass transition points of monomers are shown in Table 1.

TABLE 1

| Alkyl ester | Number of carbon atoms of alkyl group | Acrylic ester | Methacrylic ester |
|---|---|---|---|
| 2-Ethyl hexyl | 8 | −85° C. | −10° C. |
| Lauryl | 12 | 15° C. | −65° C. |
| Lauryl, | 12,13 | >−15° C. | <−46° C. |

TABLE 1-continued

| Alkyl ester | Number of carbon atoms of alkyl group | Acrylic ester | Methacrylic ester |
| --- | --- | --- | --- |
| trydecyl | | | |
| Tridecyl | 13 | 20° C. | −46° C. |
| Stearyl | 18 | >35° C. | 38° C. |

The examples are 2-ethylhexyl methacrylate, lauryl acrylate, lauryl-tridecyl acrylate mixed ester, tridecyl acrylate, stearyl acrylate, and stearyl methacrylate.

The examples of at least one derivative selected from the group consisting of acrylic acid, methacrylic acid, acrylamide, and methacrylamide and containing at least one group selected from the class consisting of carboxyl group, amino group, quaternary ammonium group, and hydroxyl group include acrylic acid, methacrylic acid, itaconic acid, dimethylaminoethyl acrylate, dimethylaminoethyl methacrylate, diethylaminoethyl acrylate, diethylaminoethyl methacrylate, trimethylaminoethyl chloride acrylate, trimethylaminoethyl chloride methacrylate, 2-hydroxyethyl acrylate, 2-hydroxyethyl methacrylate, 2-hydroxpropyl acrylate, 2-hydroxypropyl methacrylate, acrylamide, dimethyl acrylamide, dimethylaminoethyl acrylamide, dimethylaminoethyl methacrylamide, trimethylaminopropyl acrylamide chloride, and trimethyl-aminopropyl methacrylamide chloride.

The monomer of the component of (C) is an alkyl methacrylate having an alkyl group of not more than 4 carbon atoms or vinyl acetate which has a high glass transition point and exhibits affinity for aliphatic hydrocarbons. The examples of this monomer usable herein include methyl methacrylate, ethyl methacrylate, isopropyl methacrylate, n-butyl methacrylate, isobutyl methacrylate, and vinyl acetate. Among other monomers mentioned above, methyl methacrylate, ethyl methacrylate, and isobutyl methacrylate prove to be particularly desirable.

The composition ratios of the components (a), (b), and (c) have notably effects on the dispersibility and solubility in the aliphatic hydrocarbon solvent, the colloid dispersibility for polymerization, and the physical properties of the absorbent polymer such as, for example, the water-absorbing property, the discreteness of beads during the course of absorption of water, the strength of the beads, and the diameter of the beads.

Generally, these mixing ratios are 40 to 95% by weight of the component (a), 5 to 40% by weight of the component (b), and 0 to 40% by weight of the component (c), preferably 45 to 70% by weight of the component (a), 5 to 25% by weight of the component (b), and 20 to 40% by weight of the component (c). The dispersibility and solubility of the monomers in the solvent are degraded when the mixing ratio of the component (a) is less than 40%. The colloid dispersibility is degraded when the mixing ratio of the component (a) exceeds 95% by weight and consequently that of the component (b) is less than 5% by weight. In either case, easy continuation of the reversed-phase suspension polymerization cannot be obtained. The dispersibility and solubility of the monomers in the solvent, the discreteness of the beads during the absorption of water by the absorbent polymer, and the strength of the beads tend to improve in proportion as the content of the component (a) increases within the range of 40 to 95% by weight. The colloid dispersibility is degraded as described above when the mixing ratio of the component (b) is less than 5% by weight. The dispersibility and solubility of the monomer is degraded when the mixing ratio of the component (b) exceeds 40% by weight. In either case, easy continuation of the reversed-phase suspension polymerization cannot be obtained. The colloid dispersibility and the speed of absorption of water by the absorbent polymer tend to improve but the discreteness of the beads during the absorption of water and the strength of the beads tend to dwindle and the diameter of the beads tends to decrease in proportion as the mixing ratio of the component (b) increases within the range of 5 to 40% by weight. The dispersibility of the monomers in the solvent is degraded when the mixing ratio of the component (c) exceeds 40% by weight and consequently the mixing ratio of the component (a) decreases. The strength of the beads of the absorbent polymer tends to improvement in proportion as the mixing ratio of the component (c) increases within the range of 0 to 40% by weight.

The acrylic copolymer to be used as a dispersant in the present invention is synthesized by the aqueous suspension polymerization. When the solution polymerization is employed instead, there is the possibility of the solvent persisting in the produced dispersant or the dispersant having the function thereof degraded by a by-produced low-molecular polymer. Typically, the aqueous suspension polymerization is effected by a procedure which comprises dissolving a partially saponified polyvinyl alcohol by heating in deionized water, bubbling nitrogen gas through the resultant solution for displacement of Possibly entrapped air, adding a solution of an azo type or peroxide type polymerization initiator in the monomers of (a), (b), and (c) dropwise for dispersion to the aqueous solution, holding the resultant dispersion at an elevated temperature to terminate polymerization, cooling the polymerization mixture, separating the solids by filtering the polymerization mixture, washing the separated solids with water, and subjecting the washed solids to vacuum drying. As the result beads of acrylic copolymer, namely the dispersant, are obtained.

The dispersant which is obtained by the method described above is dispersed and solved in the aliphatic hydrocarbon solvent for the reversed-phase suspension polymerization. The amount of the dispersant to be used is in the range of 0.1 to 10% by weight, preferably 0.5 to 5% by weight, based on the total amount of acrylic acid and an alkali metal salt thereof. The colloid dispersibility for polymerization is unstable when the amount of the dispersant is less than 0.1% by weight. The produced beads have an unduly small diameter and are deficient in economy when the amount of the dispersant exceeds 10% by weight.

The aqueous solution of acrylic acid and an alkali metal salt thereof is prepared by partially neutralizing acrylic acid monomer as with an aqueous solution of sodium hydroxide or potassium hydroxide. In due consideration of the ability to absorb water and the safety, the degree of neutralization is desired to be in the range of 60 to 85%. The monomer concentration in the aqueous solution is desired to be in the range of 35 to 75% by weight, preferably 40 to 70% by weight.

In the production of the absorbent polymer, an unsaturated monomer copolymerizable with acrylic acid and an alkali metal salt of acrylic acid as a monomer may be allowed to participate in the copolymerization.

The polymerization initiator for the reversed-phase suspension polymerization of the aqueous solution of acrylic acid and an alkali metal salt thereof is a self-crosslinking type substance having no use for a cross-linking agent monomer. It is, therefore, desired to be hydrogen peroxide or a water-soluble persulfate such as potassium persulfate or ammonium persulfate. The amount of the polymerization initiator to be used is desired to be in the range of 0.1 to 2.0% by weight, preferably 0.2 to 1.0% by weight.

The aliphatic hydrocarbon solvents which are usable for the reversed-phase suspension polymerization include aliphatic hydrocarbons such as n-pentane, n-hexane, n-heptane, and n-octane and alicyclic hydrocarbons such as cyclohexane, methy cyclohexane, and Decalin (decahydronaphthalene), for example. Among other aliphatic hydrocarbon solvents mentioned above, n-hexane, n-heptane, and cyclohexane prove to be particularly desirable.

In the production of the absorbent polymer, one particularly important requirement is that after completion of the reversed-phase suspension polymerization, the product of this polymerization should be cross-linked with a cross-linking agent.

This cross-linking agent is only required to be a compound possessing at least two functional groups capable of reacting with a carboxyl group (or a carboxylate group). The cross-linking agents of this description include polyglycidyl ethers such as ethylene glycol diglycidyl ether, polyethylene glycol diglycidyl ether, and glycerin triglycidyl ether; haloepoxy compounds such as epichlorohydrin and α-methylchlorohydrin; and polyaldehydes such as glutaraldehyde and glyoxal, for example. Among other cross-linking agents mentioned above, ethylene glycol glycidyl ether proves to be particularly desirable.

The amount of the cross-linking agent to be added generally in the range of 0.05 to 2% by weight, based on the total amount of acrylic acid and an alkali metal salt thereof, though this range is variable with the kind of the cross-linking agent and the kind of the dispersant. The discreteness of the beads during the course of water absorption and the strength of the beads are degraded when the amount of the cross-linking agent to be used is less than 0.05% by weight. The cross-linking density is unduly high and the ability to absorb water is notably low when the amount is more than 2% by weight.

When an inorganic substance is added to the system in which the cross-linking reaction is carried out, it contributes to enhancing the discreteness of the beads during the course of water absorption. The inorganic substances which serve this purpose include white carbon, talc, hydrotalcite, and finely divided silica (aerosil), for example. In this case, a surfactant may be additionally used. The conventional nonionic surfactants are available.

The cross-linking reaction can be effected as known heretofore to the art by simply adding the cross-linking agent during the course of azeotropic dehydration or desiccation by vacuum heating. The addition during the azeotropic dehydration is effected more easily.

Unlike the commercially available polymer, the absorbent polymer to be used in the present invention is conspicuous for the discreteness of the polymer beads. From the fact that the effectiveness in enhancing the discreteness increases in proportion as the component (a) of the acrylic copolymer as the dispersant increases and the cross-linking agent increases, it can be inferred that the slipperiness of the water-absorbed polymer is ascribable to the improved discreteness. The component (a) of the dispersant enhances the volatileness of the water-absorbed polymer and the cross-linking agent increases the speed of water absorption and, at the same time, decreases viscosity of the surface by heightening the cross-linking degree of the polymer. Owing to these effects, the water-absorbed beads of polymer have a small amount of water as the binder and, therefore, slip against one another and give rise to intervening gaps, and manifest discreteness of beads and flowability.

The capacity of the absorbent polymer used in the inclusion water of this invention for absorbing deionized water is up to 200 times the weight of the absorbent polymer. The inclusion water fulfils its function merely by causing the absorbent polymer to absorb water in the required amount. For the purpose of enabling the minute beads to retain their discreteness intact, the amount of water to be as absorbed by the inclusion water is desired to be not more than ⅔ of the capacity of the polymer for water.

The diameter of the inclusion water beads of the present invention can be freely varied in the range of 0.03 to 5.0 mm, depending on the particle diameter of the absorbent polymer and the amount of water to be absorbed. This diameter can be selected in combination with the conditions of the work of gypsum mixing.

The inclusion water is mixed with hemihydrate gypsum or anhydrous gypsum each in the form of powder. The resultant mixture is then subjected to pressure molding, extrusion molding, or roller molding. Under the pressure thus exerted, the absorbent polymer is compelled to release water and the liberated water is allowed to hydration of the surrounding gypsum, with the result that a shaped article of gypsum is produced.

The shaped article of gypsum of the present invention which is obtained by the method of the present invention is notably excels the product of the conventional method in strength and durability.

EXAMPLES

Now, the method of production contemplated by the present invention will be specifically described below with reference to working examples, which are intended merely to be illustrative of and not in any sense limitative of the present invention.

The water absorbing property, the particle diameter, and the discreteness of beads during the course of water absorption reported herein have been determined by the following procedures.

① Water absorbing property

The capacity for absorption deionized water is determined by dispersing 0.5 g of a dry polymer sample in 1 liter of deionized water, allowing the resultant dispersion to stand at rest overnight, filtering the dispersion through a 80-mesh metallic gauze thereby separating swelled polymer, weighing the swelled polymer (W), and dividing the weight (W) by the weight of the dry polymer ($W_0$). The quotient (W/$W_0$) is reported as the deionized water absorbing property (g/g).

The capacity for absorption of 0.9% saline solution is determined by dispersing 0.2 g of a dry polymer sample in 60 g of 0.9% saline water, allowing the resultant dispersion to stand at rest for 20 minutes, filtering the dispersion through a 100-mesh metallic gauze thereby separating swelled polymer, weighing the swelled polymer (W), and dividing the weight (W) by the weight of the dry polymer ($W_0$). The quotient ($W/W_0$) is reported as the 0.9% saline water absorbing property (g/g).

② Particle diameter

This property is determined by treating an absorbent polymer (dry) sample by the centrifugal sedimentation method using an automatic particle diameter distribution measuring device (produced by Horiba Seisakusho K.K. and marketed under product code of "CAPA-300"). The median value of surface area consequently found is reported as the particle diameter.

The particle diameter of a water-absorbed polymer sample is determined by allowing 1.0 g of a dry polymer sample to stand in 50 cc of deionized water, photographing the swelled polymer under an optical microscope, measuring the diameters of the swelled beads in the photomicrograph. The average particle diameter consequently found is reported as the particle diameter of absorbed polymer.

③ Discreteness of particles

The discreteness of water-absorbed particles is determined by visually examining sample water-absorbed particles and rating the condition of the particles on the following three-point scale.

○: The individual particles are separated clearly from one another and manifest flowability.

Δ: The individual particles partly cohere and manifest poor flowability.

x: The individual particles assume the form of gel and manifest absolutely no flowability.

Typical examples of synthesis of dispersant (acrylic copolymer) will be cited below.

Synthesis 1

In a separable flask having an inner volume of 500 ml and provided with a stirrer, a reflux condenser, a dropping funnel, a thermometer, and a nitrogen gas inlet tube, 150 g of deionized water and 0.2 g of a partially saponified polyvinyl alcohol (produced by Nippon Synthetic Rubber Co., Ltd. and marketed under product code of "GH-23") added thereto as a dispersant were heated for solution and the air entrapped in the flask was displaced with nitrogen gas.

Separately in an Erlenmeyer flask, 1.0 g of azobisdimethyl valeronitrile was dissolved in 32.5 g of lauryl-tridecyl acrylate mixed ester (produced by Osaka Organic Chemical Industry Co., Ltd. and marketed under product code of "LTA"), 10.0 g of hydroxyethyl methacrylic acid, and 17.5 g of methyl methacrylate. The resultant solution was added dropwise to the aforementioned separable flask over a period of 1 hour, with the contents of the flask bubbled with nitrogen gas. The resultant mixture in the separable flask was kept at 85° C. for 5 hours to complete the reaction. The hot mixture was then cooled. The cooled mixture was filtered to separate solids. The solids were washed with water and then vacuum dried to obtain beads of dispersant (1).

Synthesis 2

Beads of dispersant (2) were obtained by following the Procedure of synthesis 1, excepting 25.0 g of lauryltridecyl acrylate mixed ester, 5.0 g of methacrylic acid, 5.0 9 of dimethylaminoethyl methacrylate, and 17.5 g of methyl methacrylate were used instead.

Synthesis 3

Beads of dispersant (3) were obtained by following the procedure of Synthesis 1, excepting 30 g of stearyl methacrylate, 10.0 g of dimethylaminopropyl methacrylamide, and 10.0 g of methyl methacrylate were used instead.

Now, typical examples of production of absorbent polymer will be cited below.

Production 1

In a separable flask having an inner volume of 1 liter and provided with a stirrer, a reflux condenser, a dropping funnel, a thermometer, and a nitrogen gas inlet tube, 360.7 g of n-hexane and 4.32 g of the dispersion (1) were heated to 50° C. for dispersion and solution and the air entrapped therein was displaced with nitrogen gas.

Separately, in an Erlenmeyer flask, 72.0 g of acrylic acid was partially neutralized with a solution of 32.2 g of sodium hydroxide in 103.6 g of deionized water and 0.24 g of potassium persulfate was dissolved in the resultant mixture at room temperature. The resultant aqueous solution of monomers was added dropwise over a period of 1 hour to the mixture in the separable flask, with the mixture kept stirred at a speed of 300 rpm and bubbled with nitrogen gas. The resultant mixture was refluxed for 2 hours and, with 0.1 g of 30% hydrogen peroxide water added thereto, further refluxed for 1 hour to complete polymerization. The resultant polymerization mixture and 0.73 g of ethylene glycol diglycidyl ether added thereto were dehydrated by azeotropy, filtered, and then vacuum dried to obtain white beads of polymer. Virtually no sign of cohesion was observed in the beads obtained in the separable flask.

The dry polymer thus obtained was found to possess a capacity for absorbing 125 g of deionized water per g, a capacity for absorbing 33 g of 0.9% saline water per g, a particle diameter of 120 $\mu$m in dry state, and a particle diameter of 480 $\mu$m in a water-absorbed state, and exhibited discreteness of beads in a water-absorbed state.

Productions 2 and 3

White beads of polymers were obtained by following the procedure of Production 1, excepting the dispersants (2) and (3) obtained in Synthesis 2 and Synthesis 3 were severally used in the place of the dispersant (1) obtained in Production 1. Virtually no sign of cohesion was observed in the beads in the separable flask in either case.

Production 4

White beads of polymer were obtained by following the procedure of Production 1, excepting cyclohexane was used in the place of n-hexane. Virtually no sign of cohesion was observed in the beads in the separable flask.

Productions 5 and 6

White beads of polymers were obtained by following the procedure of Production 1, excepting the amount of ethylene glycol diglycidyl ether to be used was changed from 0.73 g to 0.18 g and 1.46 g respectively. Virtually no sign of cohesion was observed in the beads in the separable flask in either case.

Production 7

White beads of polymer were obtained by following the procedure of Production 1, excepting the addition of ethylene glycol diglycidyl ether was omitted. Virtually no sign of cohesion was observed in the beads in the separable flask.

Production 8

White beads of polymer were obtained by following the procedure of Production excepting sorbitan laurate was used in the place of the dispersant (1). Adhesion of the polymer was observed on the wall surface and the stirring blades inside the separable flask.

Production 9

A commercial product (produced by Nippon shokubai Kagaku Kogyo Co. Ltd. and marketed under trademark designation of "Aquarick CA-W").

The results of evaluation of the products of Productions 1 to 9 were as shown in Table 2.

TABLE 2

| Production | Capacity of absorption of water (g/g) | | Diameter of dry polymer beads ($\mu$m) | Diameter of wet polymer beads ($\mu$m) | Discreteness of beads in wet state |
| --- | --- | --- | --- | --- | --- |
| | Deionized water | 0.9% saline solution | | | |
| 1 | 125 | 33 | 120 | 0.48 | ○ |
| 2 | 110 | 30 | 50 | 0.20 | ○ |
| 3 | 150 | 33 | 170 | 0.62 | ○ |
| 4 | 180 | 35 | 90 | 0.30 | ○ |
| 5 | 200 | 35 | 100 | 0.31 | ○ |
| 6 | 80 | 26 | 120 | 0.45 | ○ |
| 7 | 540 | 58 | 110 | 0.39 | Δ |
| 8 | 160 | 37 | Not measurable (secondary conglomeraction) | Not measurable | X |
| 9 | 260 | 42 | 500 | 1.6 | X |

EXAMPLE 1

In a stainless steel beaker having an inner volume of 10 liters, 5 liters of tap water was placed and kept stirred and, at the same time, 50 g of the absorbent polymer obtained in Production 1 was gradually added to the stirred water. The inclusion water consequently formed and hemihydrate gypsum ($\alpha$ type) were placed in the ratio shown below and stirred in a mixer to produce a gypsum-water mixture.

Hemihydrate gypsum ($\alpha$ type): inclusion water = 100:22

Four test pieces measuring 15 mm × 15 mm × 90 mm were produced by treating the mixture with a vacuum deaeration type extrusion molding device, left standing in the open air for 2 hours, and tested for wet tensile strength (kg/cm$^2$). The four test pieces showed 215, 201, 231, and 198 kg/cm$^2$ of wet tensile strength, averaging 211 kg/cm$^2$.

EXAMPLE 2

Test pieces were obtained by following the procedure of Example 1, excepting the mixing ratio of hemihydrate gypsum ($\alpha$ type) to inclusion water changed to 100:30. The test pieces showed 167, 145, 152, and 158 kg/cm$^2$ of strength, averaging 156 kg/cm$^2$.

COMPARATIVE EXPERIMENT 1

When hemihydrate gypsum ($\alpha$ type) and tap water were mixed in a ratio of 100:22 in a mixer, they failed to produce a homogeneous gypsum-water mixture. Test pieces produced by treating the gypsum-water mixture similarly sustained cracks.

COMPARATIVE EXPERIMENT 2

Test pieces were produced by mixing hemihydrate gypsum ($\alpha$ type) and tap water in a ratio of 100:46 in a mixer to prepare a gypsum-water mixture and extrusion molding the resultant gypsum-water mixture. They showed 76, 69, 71, and 65 kg/cm$^2$ of wet tensile strength, averaging 70 kg/cm$^2$.

What is claimed is:

1. A method for the production of a shaped article of gypsum, comprising by producing an absorbent polymer by dissolving in an aliphatic hydrocarbon an acrylic copolymer using as components thereof (a) 40 to 95% by weight of an alkyl acrylate or an alkyl methacrylate, having an alkyl group of not less than 8 carbon atoms, (b) 5 to 40% by weight of a monomer, specifically at least one derivative selected from the group consisting of acrylic acid, methacrylic acid, acrylamide, and methacrylamide and containing at least one group selected from the class consisting of carboxyl group, amino group, quaternary ammonium group, and hydroxyl group, and (c) to 40% by weight of an unsaturated monomer copolymerizable with the components (a) and (b) mentioned above, dispersing an aqueous solution of acrylic acid and an alkali metal salt thereof in the resultant solution, subjecting the resultant dispersion to reversed-phase suspension polymerization, cross-linking the resultant polymer with a cross-linking agent, and drying the cross-linked polymer, swelling said absorbent polymer thereby preparing an inclusion water for hardening gypsum, and mixing said inclusion water and hemihydrate gypsum or anhydrous gypsum each in the form of powder thereby causing the inclusion water to be released from the resultant mixture and allowed to harden the gypsum by hydration.

2. A method according to claim 1, wherein said cross-linking agent is ethylene glycol diglycidyl ether.

3. A method according to claim 1, wherein an inorganic substance is added to the polymer during the course of cross-linking treatment.

* * * * *